(12) United States Patent
Inoue et al.

(10) Patent No.: US 10,850,342 B2
(45) Date of Patent: Dec. 1, 2020

(54) DISSIMILAR-METAL JOINING TOOL

(71) Applicant: FANUC CORPORATION, Yamanashi (JP)

(72) Inventors: Toshihiko Inoue, Yamanashi (JP); Shunichi Saito, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 27 days.

(21) Appl. No.: 16/433,220

(22) Filed: Jun. 6, 2019

(65) Prior Publication Data

US 2020/0009676 A1    Jan. 9, 2020

(30) Foreign Application Priority Data

Jul. 5, 2018   (JP) .................. 2018-128375

(51) Int. Cl.
*B23K 9/00*    (2006.01)
*B21J 13/08*   (2006.01)
(Continued)

(52) U.S. Cl.
CPC .............. *B23K 9/232* (2013.01); *B23K 37/04* (2013.01); *B23K 2103/02* (2018.08); *B23K 2103/08* (2018.08)

(58) Field of Classification Search
CPC .......... B23K 9/00; B23K 9/0026–0043; B23K 37/02; B23K 37/0211; B23K 37/0217; B23K 37/0223; B23K 37/04; B23K 37/0408; B23K 37/0426; B23K 37/0435; B23K 37/0443; B23K 2103/02;
(Continued)

(56) References Cited

U.S. PATENT DOCUMENTS 3,095,951 A    7/1963  Rood et al.
4,359,599 A *  11/1982 Benner ................ B23K 9/0035
                                              174/94 R
(Continued)

FOREIGN PATENT DOCUMENTS

JP    2014-226698 A    12/2014
JP    2018-34166 A     3/2018
JP    2018-51570 A     4/2018

OTHER PUBLICATIONS

Japanese Office Action dated Apr. 21, 2020, in connection with corresponding JP Application No. 2018-128375 (6 pgs., including machine-generated English translation).

*Primary Examiner* — Sang Y Paik
(74) *Attorney, Agent, or Firm* — Maier & Maier, PLLC (57) ABSTRACT

A dissimilar-metal joining tool that places a ring-shaped joining auxiliary member made of iron, on a surface of a workpiece in which a second metal plate made of non-ferrous metal is laminated on a first metal plate made of iron, coaxially with a through-hole penetrates the second metal plate, and that performs arc welding toward an inner hole of the joining auxiliary member, the dissimilar-metal joining tool includes a base attached to a distal end of a robot; an arc welding torch attached to the base; a positioning mechanism provided in the base, and places the inner hole at a joining position in the arc welding torch and holds the joining auxiliary member in a radially-positioned state; and a pressing mechanism presses the joining auxiliary member in the vicinity of an outer peripheral edge.

5 Claims, 11 Drawing Sheets

(51) Int. Cl.
*B23K 9/23* (2006.01)
*B23K 37/04* (2006.01)
*B23K 103/08* (2006.01)
*B23K 103/02* (2006.01)

(58) Field of Classification Search
CPC .. B23K 2103/08; B23K 2103/18; B23K 9/02; B23K 9/0203; B23K 9/0206; B23K 9/232; B23K 9/32
USPC ..... 219/136, 137 R, 158–162, 124.1–124.31
See application file for complete search history.

(56) References Cited

U.S. PATENT DOCUMENTS

2017/0297151 A1* 10/2017 Kodama ................ B23K 37/06
2018/0297146 A1* 10/2018 Tomioka ............ B23K 20/1215

* cited by examiner

FIG. 14

DISSIMILAR-METAL JOINING TOOL

CROSS-REFERENCE TO RELATED APPLICATIONS

This application is based on Japanese Patent Application No. 2018-128375, the contents of which are incorporated herein by reference.

FIELD

The present invention relates to a dissimilar-metal joining tool.

BACKGROUND

In the related art, there is a known joining method in which a second metal plate made of non-ferrous metal is disposed on a first metal plate made of iron in a laminated state, and the first metal plate and the second metal plate are joined by means of welding (for example, see Japanese Unexamined Patent Application, Publication No. 2018-34166 and Japanese Unexamined Patent Application, Publication No. 2018-51570).

In this joining method, each of the first metal plate and the second metal plate is provided with a through-hole that penetrates therethrough in the plate thickness direction, the through-holes are aligned with each other so that the second metal plate is disposed in a laminated state, and in a state in which a ring-shaped joining auxiliary member is disposed on the second metal plate so as to be coaxial with the through-holes, a filler material and the joining auxiliary member are melted by means of arc welding to fill the through-holes, whereby the first metal plate and the second metal plate that are formed of dissimilar metals are joined in a laminated state.

SUMMARY

An aspect of the present invention is a dissimilar-metal joining tool that places a ring-shaped joining auxiliary member made of iron, on a surface of a workpiece in which a second metal plate made of non-ferrous metal is disposed on a first metal plate made of iron in a laminated state, coaxially with a through-hole provided so as to penetrate through the second metal plate in a plate thickness direction, and that performs arc welding toward an inner hole of the joining auxiliary member, the dissimilar-metal joining tool including: a base that is attached to a distal end of a robot; an arc welding torch that is attached to the base; a positioning mechanism that is provided in the base, and that places the inner hole at a joining position in front of the arc welding torch and holds the joining auxiliary member in a radially-positioned state; and a pressing mechanism that presses the joining auxiliary member, which is held by the positioning mechanism, in the vicinity of an outer peripheral edge and in a thickness direction.

In the abovementioned aspect, an auxiliary member supply portion that supplies the joining auxiliary member to the joining position may be provided, wherein: the positioning mechanism may have a guide hole that accommodates the joining auxiliary member, which has been supplied by the auxiliary member supply portion, so as to be movable in a pressing direction; and the guide hole may have a tapered inner surface that is gradually tapered toward the front of the arc welding torch.

In the abovementioned aspect, the pressing mechanism may be provided with: a tubular pressing piece that has a central hole into which a welding wire supplied by the arc welding torch can be inserted, and an end face of which in an axial direction is disposed so as to face the vicinity of the outer peripheral edge of the joining auxiliary member supplied to the joining position; and an actuator that moves the pressing piece in the axial direction.

In the abovementioned aspect, when arc welding is performed by the arc welding torch, the pressing piece may maintain the joining auxiliary member in a state in which the joining auxiliary member is pressed in the thickness direction.

In the abovementioned aspect, a camera for detecting the through-hole formed in the second metal plate may be provided.

DETAILED DESCRIPTION

A dissimilar-metal joining tool 1 according to an embodiment of the present invention will be described below with reference to the drawings.

Figure 1:
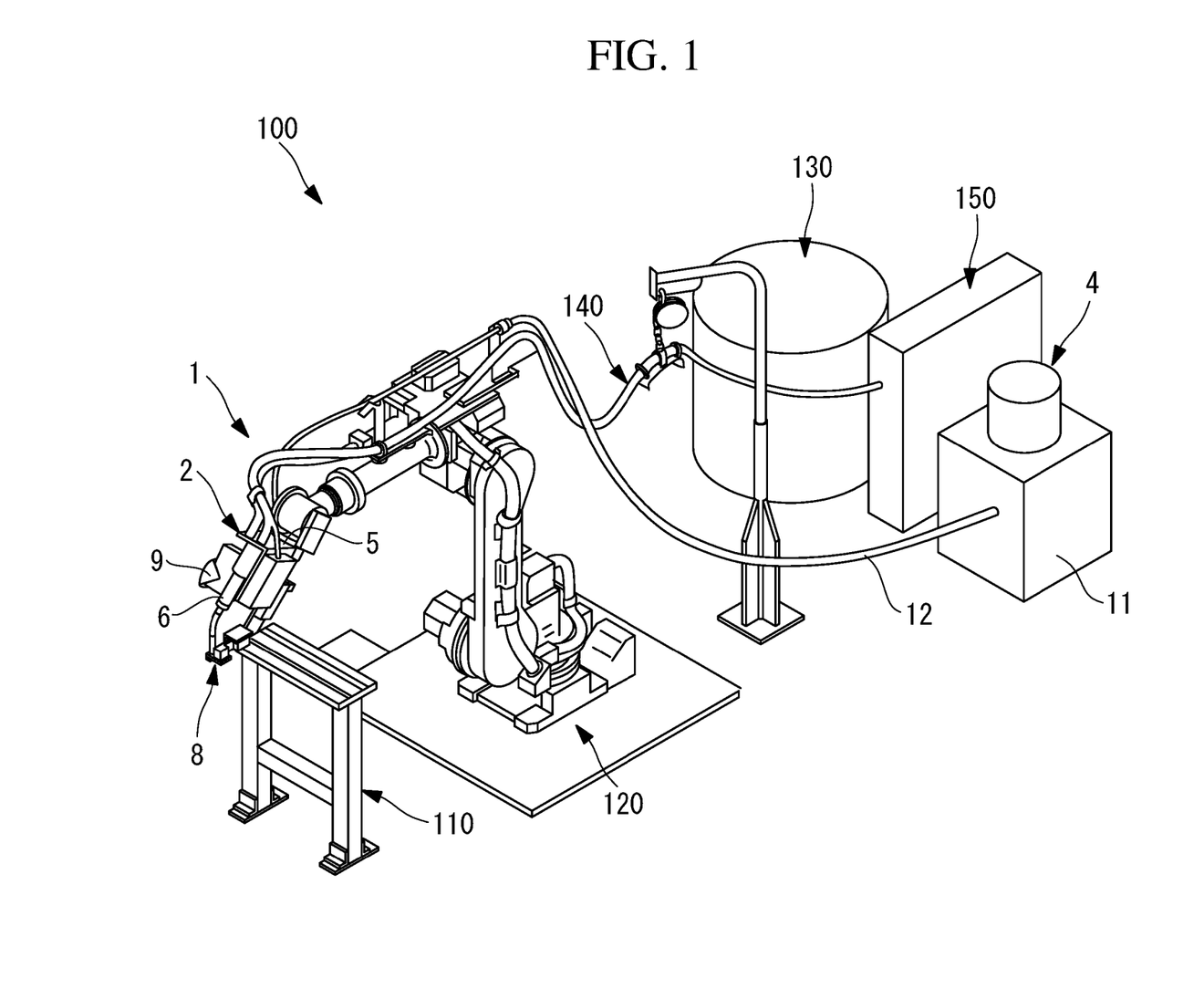
FIG. 1 is a perspective view showing a robot system provided with a dissimilar-metal joining tool according to an embodiment of the present invention.
Figure 2:
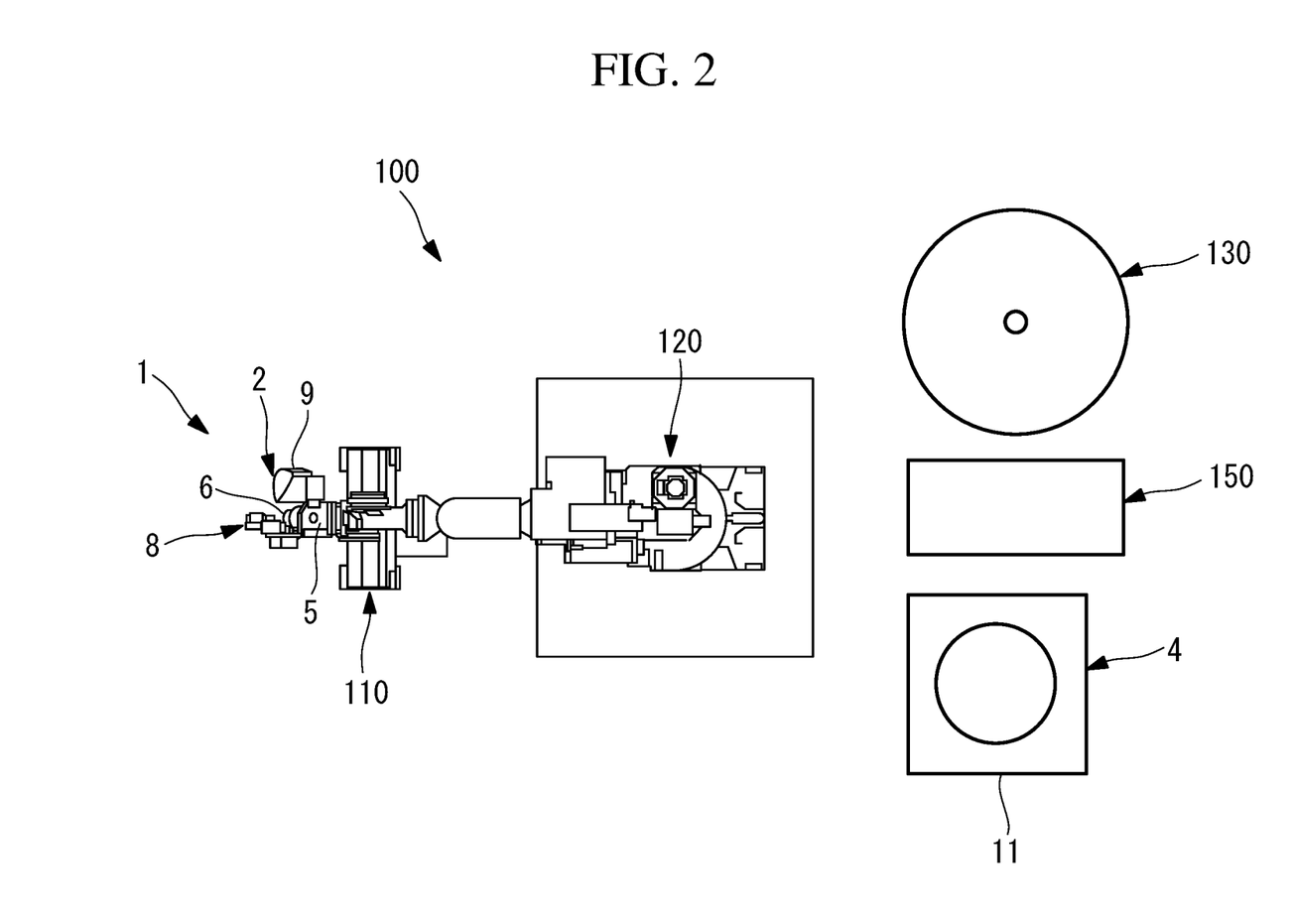
FIG. 2 is a plan view showing the robot system in FIG. 1.

The dissimilar-metal joining tool 1 according to this embodiment is used in a robot system 100 shown in FIGS. 1 and 2.

As shown in FIG. 1, the robot system 100 is provided with: a workpiece stand 110 to which a workpiece W is attached; for example, a six-axis articulated robot 120; the dissimilar-metal joining tool 1; a control unit (not shown) that controls the robot 120; a wire tank 130 that accommodates a welding wire 140 to be supplied to an arc welding torch 6 of the dissimilar-metal joining tool 1; and a welding power supply 150 that applies power to the welding wire 140. In the figure, reference sign 4 indicates an auxiliary member supply portion, which will be described later.

Figure 3:
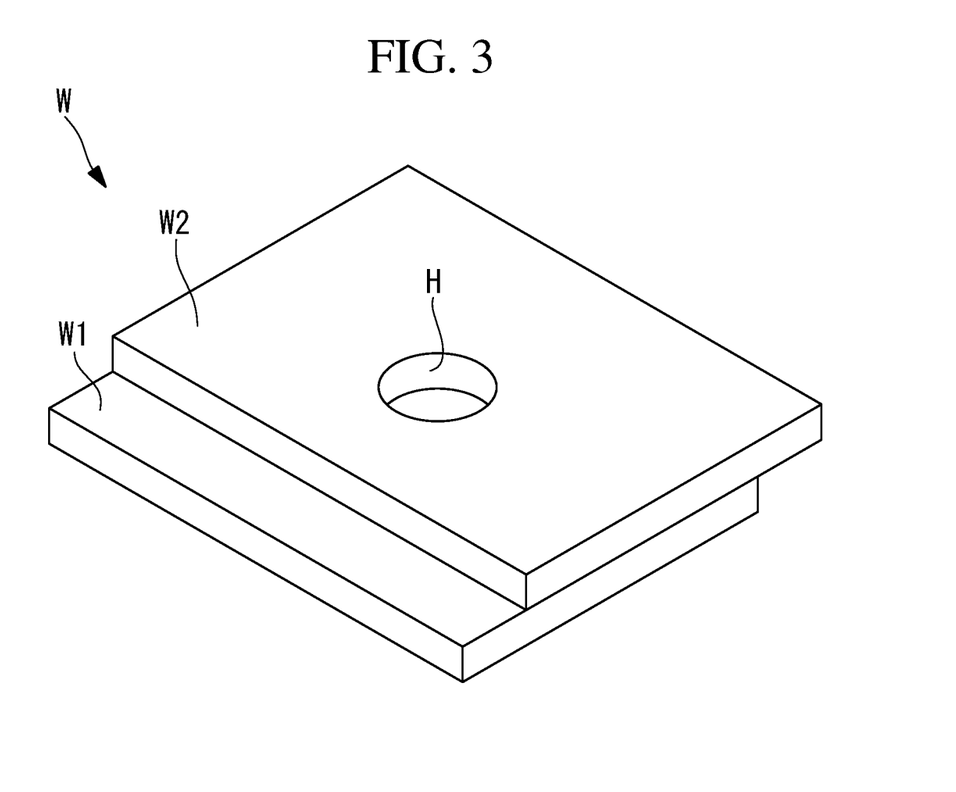
FIG. 3 is a perspective view showing an example of a workpiece in which joining is performed by the dissimilar-metal joining tool according to this embodiment.

As shown in FIG. 3, the workpiece W is formed by placing a second metal plate W2 made of non-ferrous metal on a first metal plate W1 made of iron so as to be laminated in the plate thickness direction, and is fixed to the workpiece stand 110 by means of a clamp (not shown). The second metal plate W2 is provided with one or more through-holes H that penetrate therethrough in the plate thickness direction.

As shown in FIG. 1, the dissimilar-metal joining tool 1 according to this embodiment is provided with: a tool body 2 that is attached to the distal end of the robot 120; and the auxiliary member supply portion 4 that supplies a joining auxiliary member 3 to the tool body 2.

The tool body 2 is provided with: a base 5 that is attached to the distal end of the robot 120; the arc welding torch 6 that is attached to the base 5; a positioning mechanism 7 that positions the joining auxiliary member 3, which has been supplied by the auxiliary member supply portion 4, at the front of the arc welding torch 6; and a pressing mechanism 8 that presses the positioned joining auxiliary member 3 against the workpiece W. In the figure, reference sign 9 indicates a camera that has a visual field range in front of the arc welding torch 6.

Figure 4:
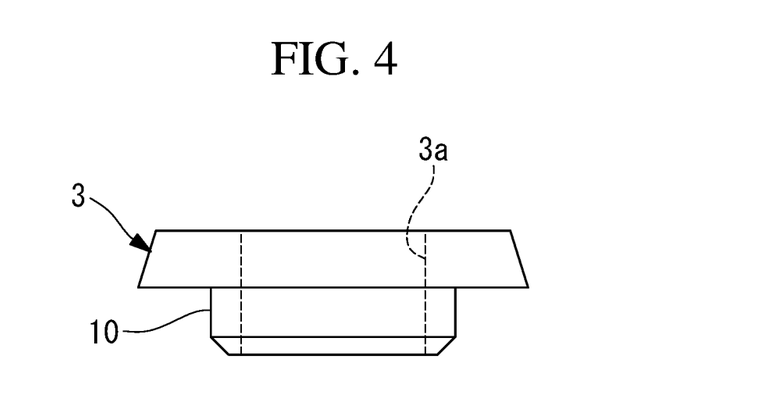
FIG. 4 is a side view showing an example of a joining auxiliary member which is assembled with the workpiece in FIG. 3.

The joining auxiliary member 3 is composed of an iron material and, as shown in FIG. 4, is a circular ring plate-shaped member having an inner hole 3a. The joining auxiliary member 3 has an outer diameter larger than the through-hole H of the second metal plate W2 of the workpiece W, and is also provided with a protrusion 10 that protrudes in the plate thickness direction on one side in the plate thickness direction and that has an outer diameter that allows the protrusion 10 to be fitted into the through-hole H in the second metal plate W2 of the workpiece W. The height of the protrusion 10 is set to be slightly smaller than the plate thickness of the second metal plate W2, and it is possible to bring an end face of the joining auxiliary member 3 on the protrusion 10 side into close contact with the surface of the second metal plate W2 in a state in which the protrusion 10 is fitted into the through-hole H.

Figure 7:
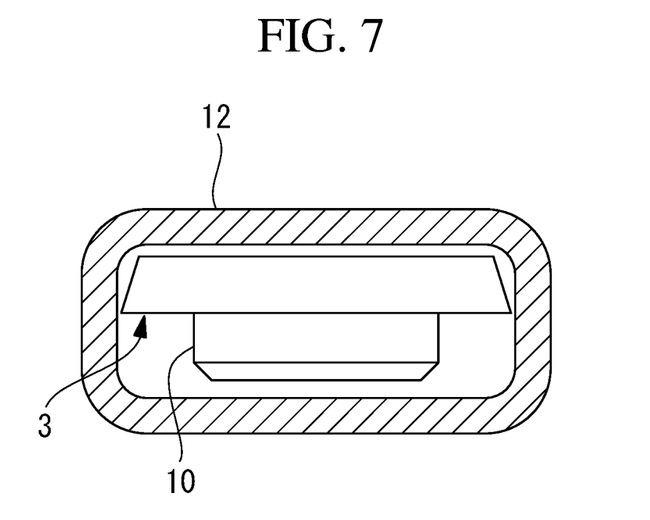
FIG. 7 is a cross-sectional view showing a hose of an auxiliary member supply portion provided in the dissimilar-metal joining tool in FIG. 1 and the joining auxiliary member in the hose.

The auxiliary member supply portion 4 is provided with: a pressure-feeding device 11 that accommodates a large number of joining auxiliary members 3 and that pressure-feeds the joining auxiliary members 3 by air pressure; and a hose 12 that connects the pressure-feeding device 11 and the tool body 2 and that supplies the joining auxiliary members 3 fed out from the pressure-feeding device 11 to the tool body 2, one by one by air pressure. As shown in FIG. 7, the cross section of the hose 12 has a shape in which the joining auxiliary member 3 can be moved in the longitudinal direction of the hose 12 while keeping the orientation of the joining auxiliary member 3 constant.

The positioning mechanism 7 is disposed in front of the arc welding torch 6 with a space therebetween and is provided with a guide hole 13 that has a tapered inner surface 13a where the inner diameter of the guide hole 13 gradually decreases toward the front thereof. A guide rail portion 14 that guides, to the guide hole 13, the joining auxiliary member 3, which has been supplied by the hose 12, while maintaining the joining auxiliary member 3 in a fixed orientation is provided between the distal end of the hose 12 of the auxiliary member supply portion 4 and the guide hole 13.

The joining auxiliary member 3 that is to be introduced, in a fixed orientation, into the guide hole 13 via the guide rail portion 14 is first introduced to a position in the guide hole 13 where the inner diameter thereof is relatively large, and while being moved forward in the guide hole 13, the joining auxiliary member 3 is positioned in a state in which the center of the inner hole 3a is made coincident with the center of the guide hole 13, by means of the tapered inner surface 13a where the inner diameter decreases.

Figure 5:
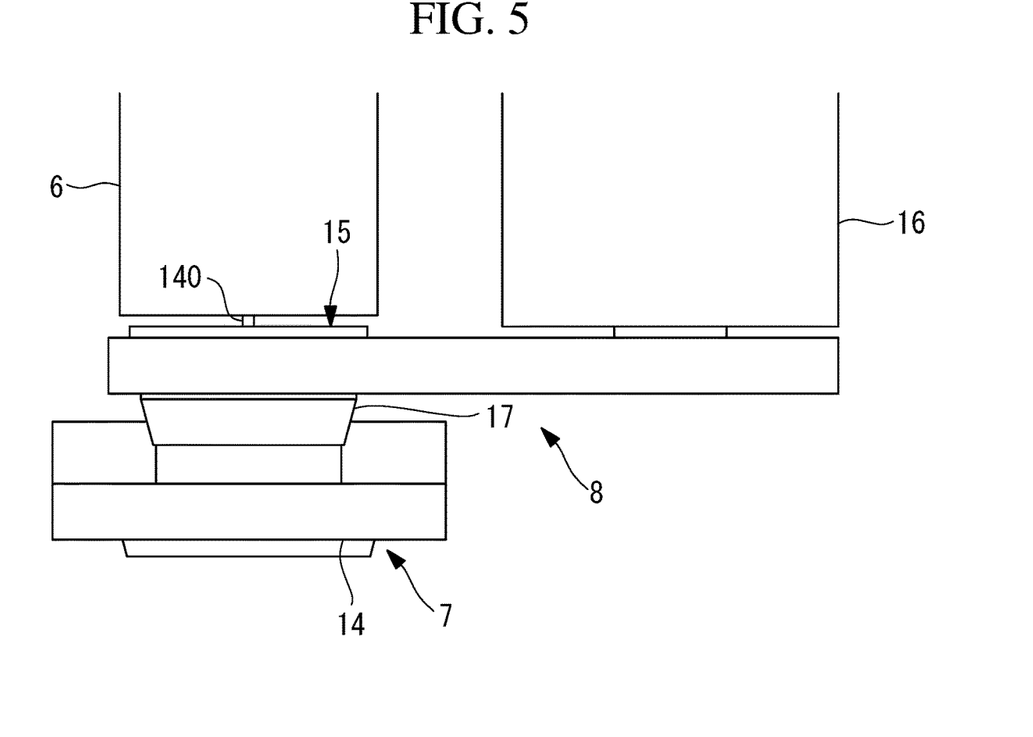
FIG. 5 is a front view partially showing a distal end portion of the dissimilar-metal joining tool in FIG. 1.
Figure 6:
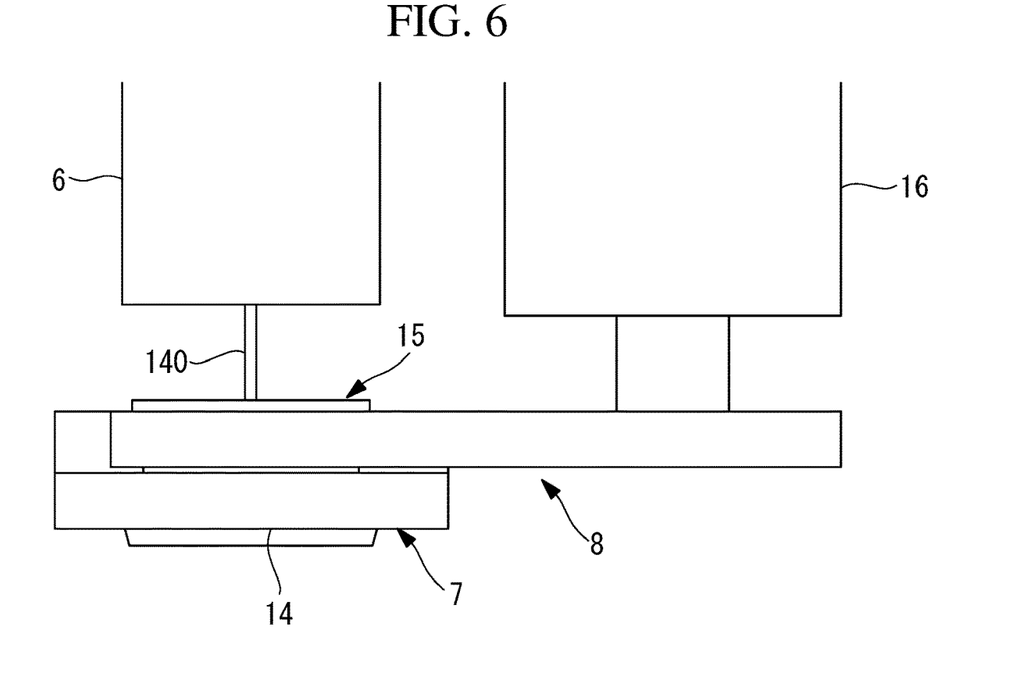
FIG. 6 is a partial front view showing a state in which the joining auxiliary member is pressed by means of a cylinder in the dissimilar-metal joining tool in FIG. 5.

The pressing mechanism 8 is provided with: a tubular pusher (pressing piece) 15 that is disposed so as to be coaxial with the guide hole 13 and so as to be movable in a direction along the axis of the guide hole 13; and a cylinder (actuator) 16 that moves the pusher 15 in a reciprocating manner in the direction along the axis of the guide hole 13. The pusher 15 can be moved in a reciprocating manner between a position at which the pusher 15 is pulled out of the guide hole 13 by actuation of the cylinder 16, as shown in FIG. 5, and a position at which the pusher 15 is pushed forward into the guide hole 13 by actuation of the cylinder 16, as shown in FIG. 6.

The pusher 15 is provided with, at the distal end thereof, a tapered surface portion 17 that is formed so as to be capable of being proximate to the tapered inner surface 13a of the guide hole 13, in order to press the vicinity of the outer peripheral edge of the joining auxiliary member 3, which is positioned in the guide hole 13 of the positioning mechanism 7, over the entire circumference of the joining auxiliary member 3 and in the axial direction of the guide hole 13. The pusher 15 has an inner hole (central hole) 15a through which the welding wire 140 is made to pass.

The operation of the thus-configured dissimilar-metal joining tool 1 according to this embodiment will be described below.

To join the first metal plate W1 made of iron and the second metal plate W2 made of non-ferrous metal in a laminated state by using the robot system 100 according to this embodiment, as shown in FIG. 3, the workpiece W in which the second metal plate W2 is stacked on the first metal plate W1 is mounted on the workpiece stand 110 and is fixed with the clamp.

Next, the robot 120 is operated, and by placing the workpiece W within the visual field range of the camera 9 and by acquiring an image of the workpiece W with the camera 9, the position of the through-hole H formed in the second metal plate W2 of the workpiece W is calculated. The control unit controls the robot 120 so that the tool body 2 is disposed at a position at which the center position of the arc welding torch 6 coincides with the calculated center position of the through-hole H.

Figure 8:
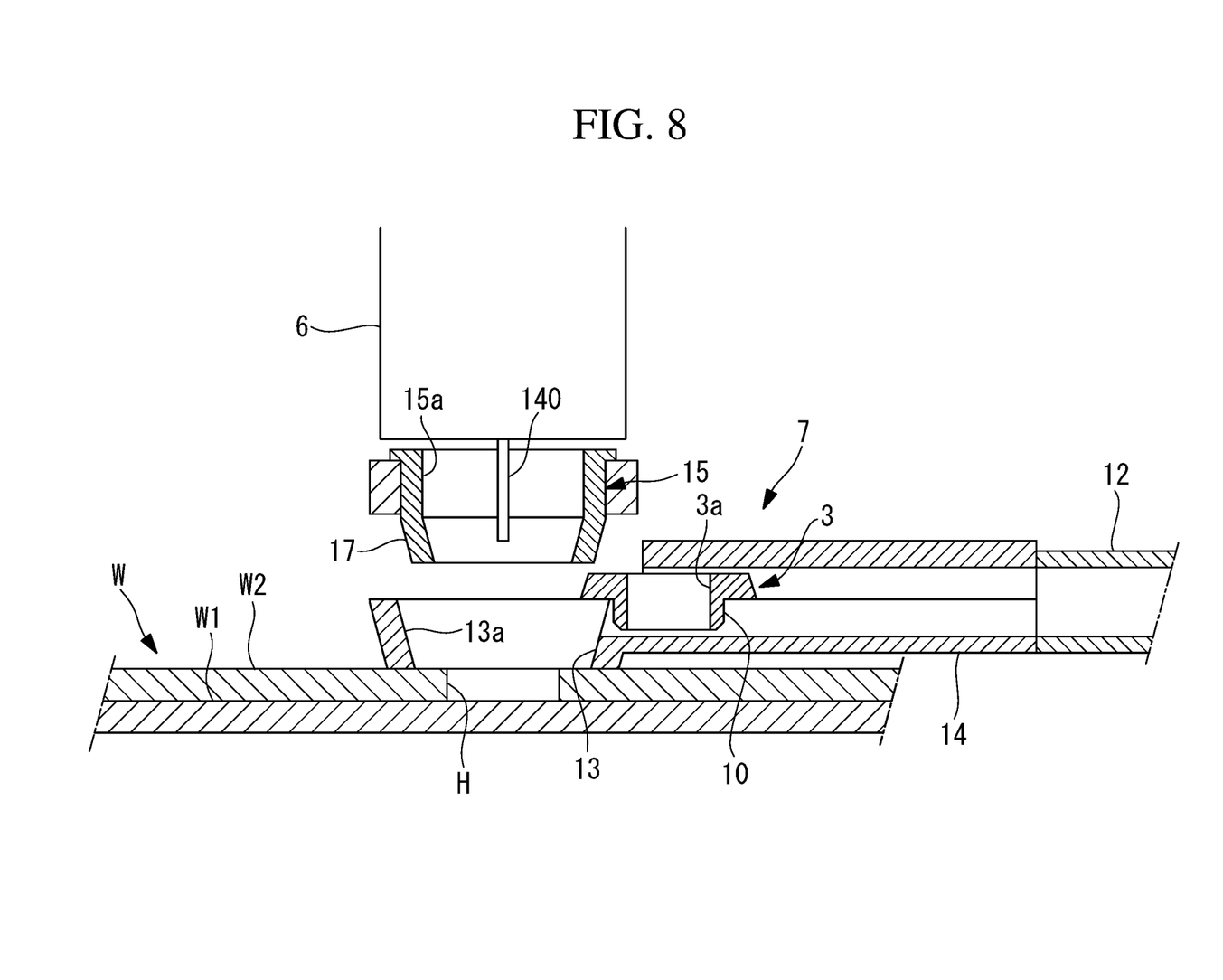
FIG. 8 is a partial longitudinal cross-sectional view showing a state in which the joining auxiliary member is supplied along a guide rail portion provided in a base of the dissimilar-metal joining tool in FIG. 1.
Figure 9:
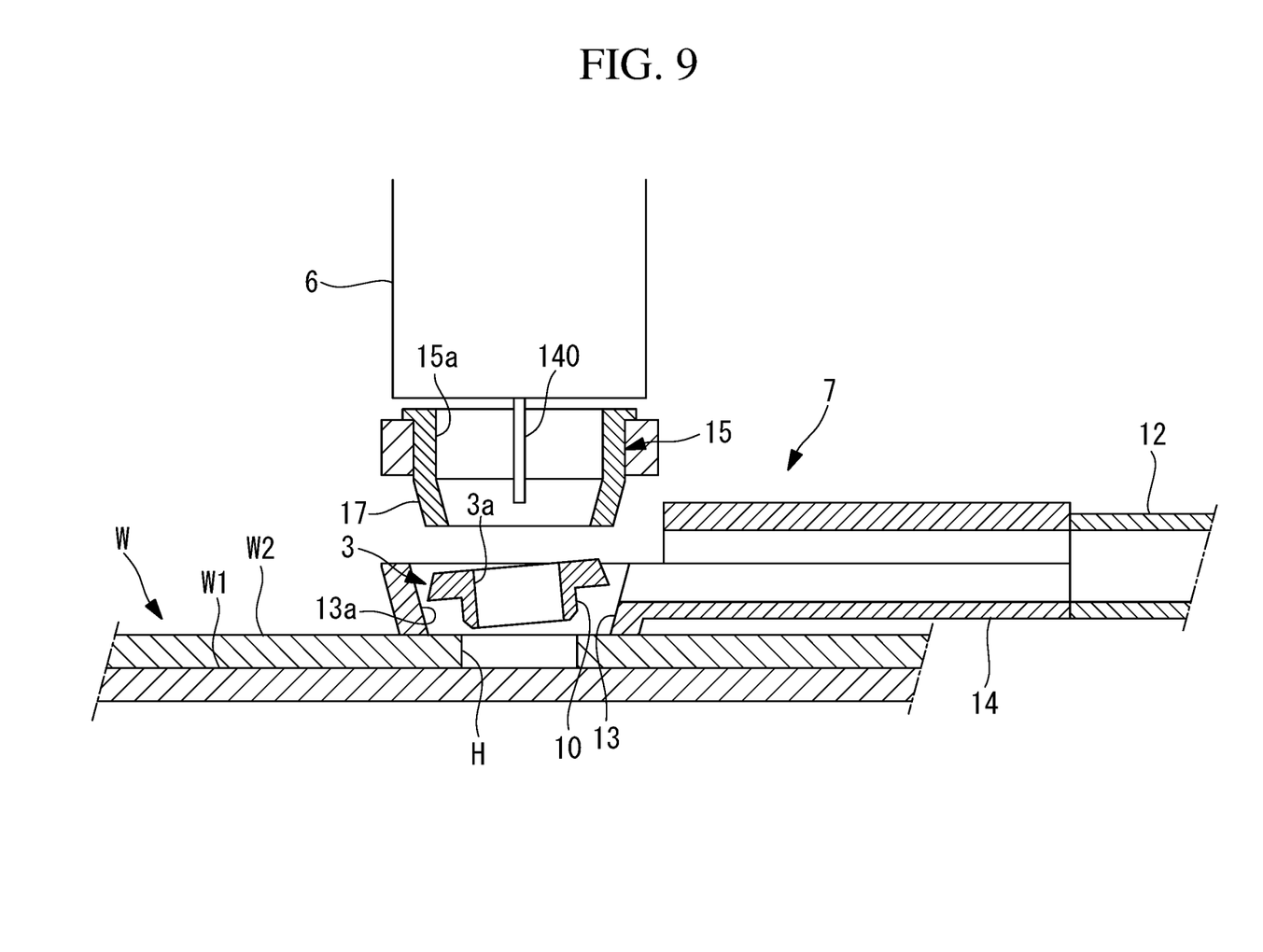
FIG. 9 is a partial longitudinal cross-sectional view showing a state in which the joining auxiliary member supplied in FIG. 8 is introduced into a guide hole of a positioning mechanism.

In this state, the pressure-feeding device 11 of the auxiliary member supply portion 4 is actuated to supply the accommodated joining auxiliary member 3 to the tool body 2 via the hose 12. When the joining auxiliary member 3, which has been pressure-fed through the hose 12, is guided to the guide hole 13 via the guide rail portion 14 of the tool body 2, as shown in FIG. 8, and is introduced into the guide hole 13, as shown in FIG. 9, the supply of the joining auxiliary member 3 by the auxiliary member supply portion 4 is temporarily stopped, and the pressing mechanism 8 is actuated.

In other words, when the pusher 15 is pushed forward by actuation of the cylinder 16, the distal end of the tubular pusher 15 presses the vicinity of the outer peripheral edge of the joining auxiliary member 3 forward and moves the joining auxiliary member 3 in a direction along the axis of the guide hole 13. Because the guide hole 13 has the tapered inner surface 13a that is gradually tapered toward the front thereof, the joining auxiliary member 3 is aligned by the tapered inner surface 13a while being moved, and positioning is performed until the center of the inner hole 3a coincides with the center position of the guide hole 13.

Figure 10:
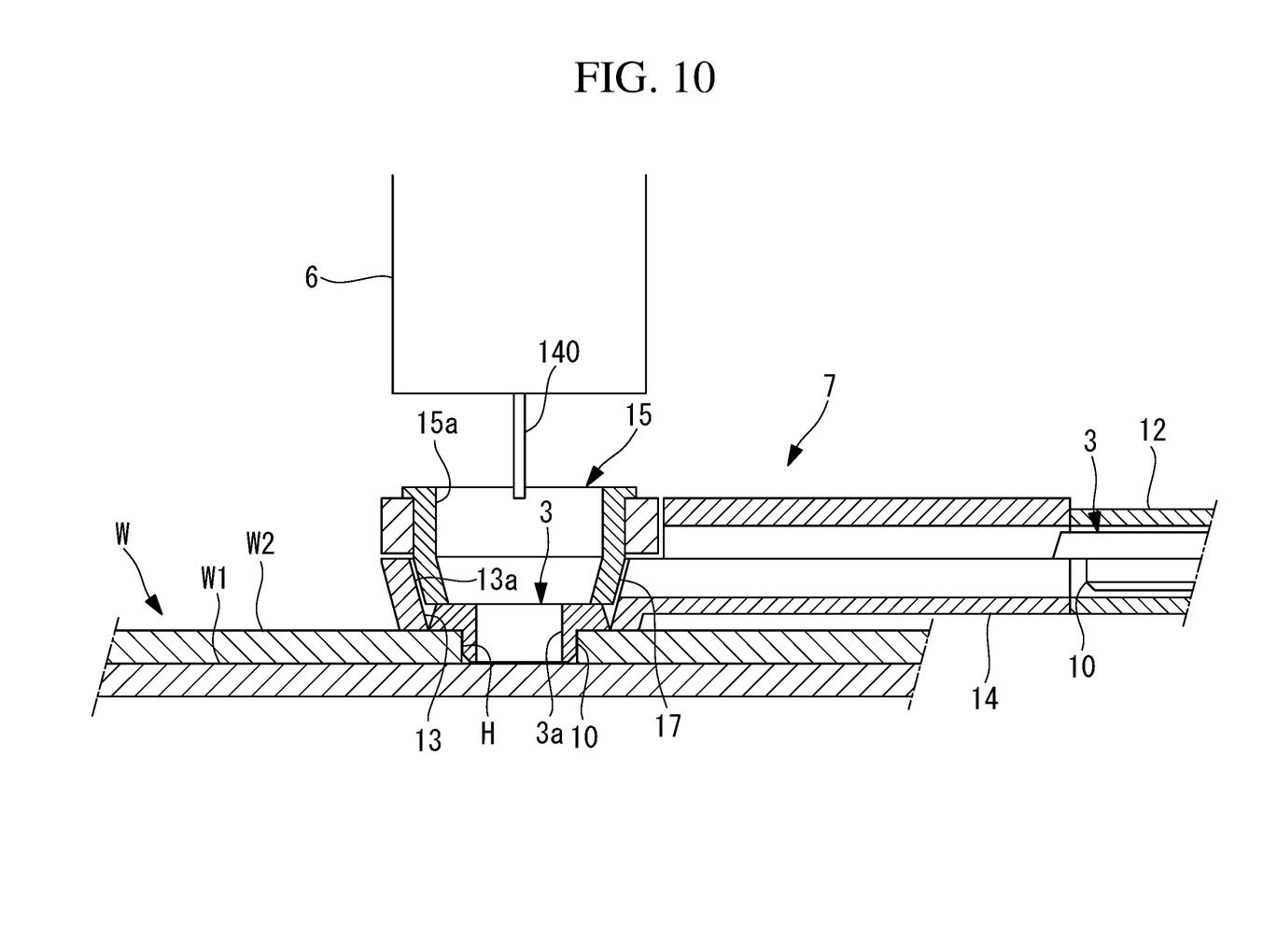
FIG. 10 is a partial longitudinal cross-sectional view showing a state in which the joining auxiliary member introduced in FIG. 9 is moved to the distal end of the guide hole by means of a pusher and is radially positioned.

In this state, as shown in FIG. 10, the protrusion 10 provided in the joining auxiliary member 3 is inserted into the through-hole H provided in the second metal plate W2, and the end face of the joining auxiliary member 3 on the protrusion 10 side is pressed against the surface of the second metal plate W2.

Figure 11:
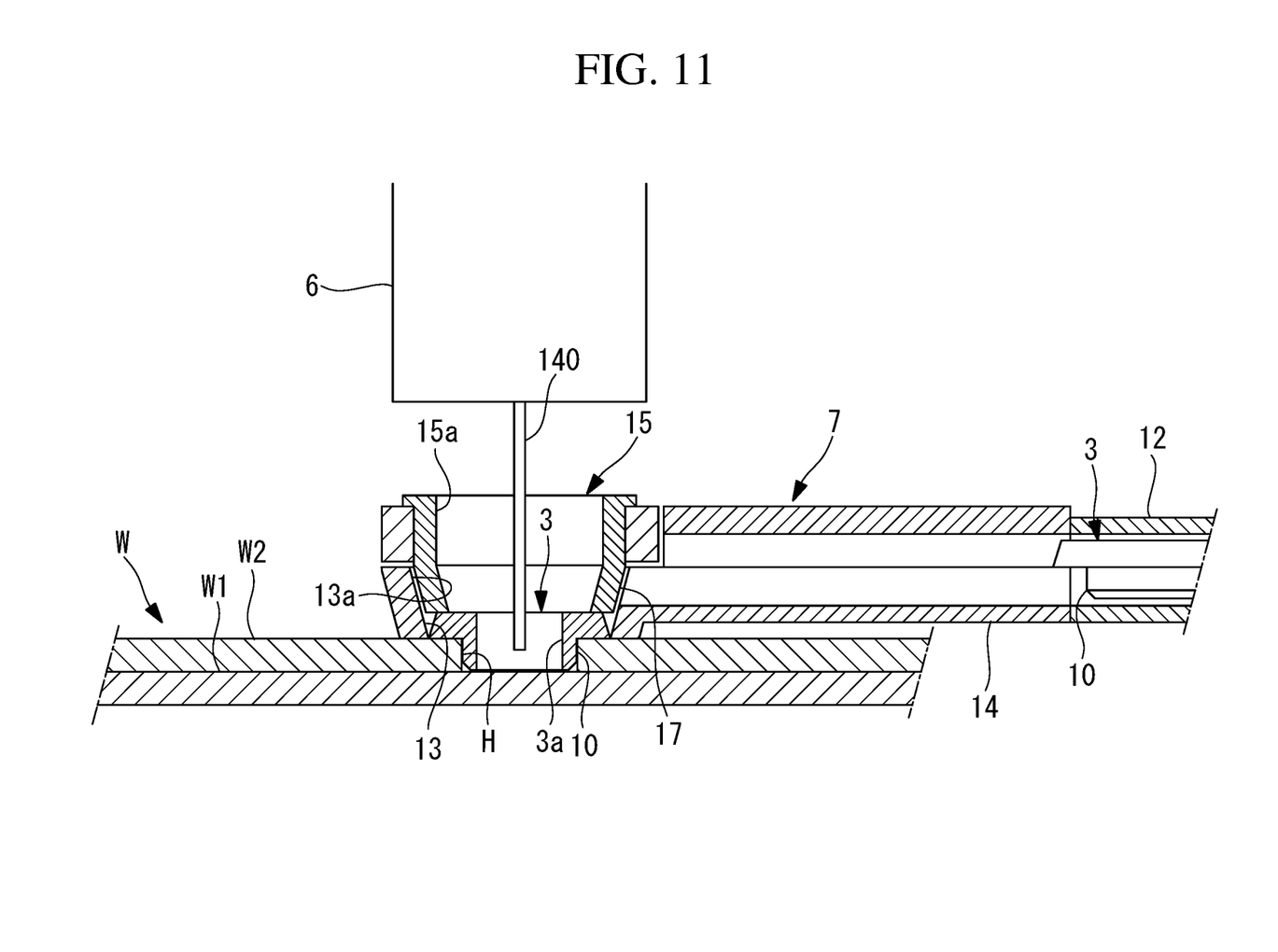
FIG. 11 is a partial longitudinal cross-sectional view showing a state in which a welding wire is inserted into an inner hole of the joining auxiliary member from the state in FIG. 10.

Subsequently, as shown in FIG. 11, the welding wire 140 is supplied from the wire tank 130 to the distal end of the arc welding torch 6, and the distal end of the welding wire 140 passes through the inner hole 15a of the pusher 15 and is disposed in the inner hole 3a of the joining auxiliary member 3.

Figure 12:
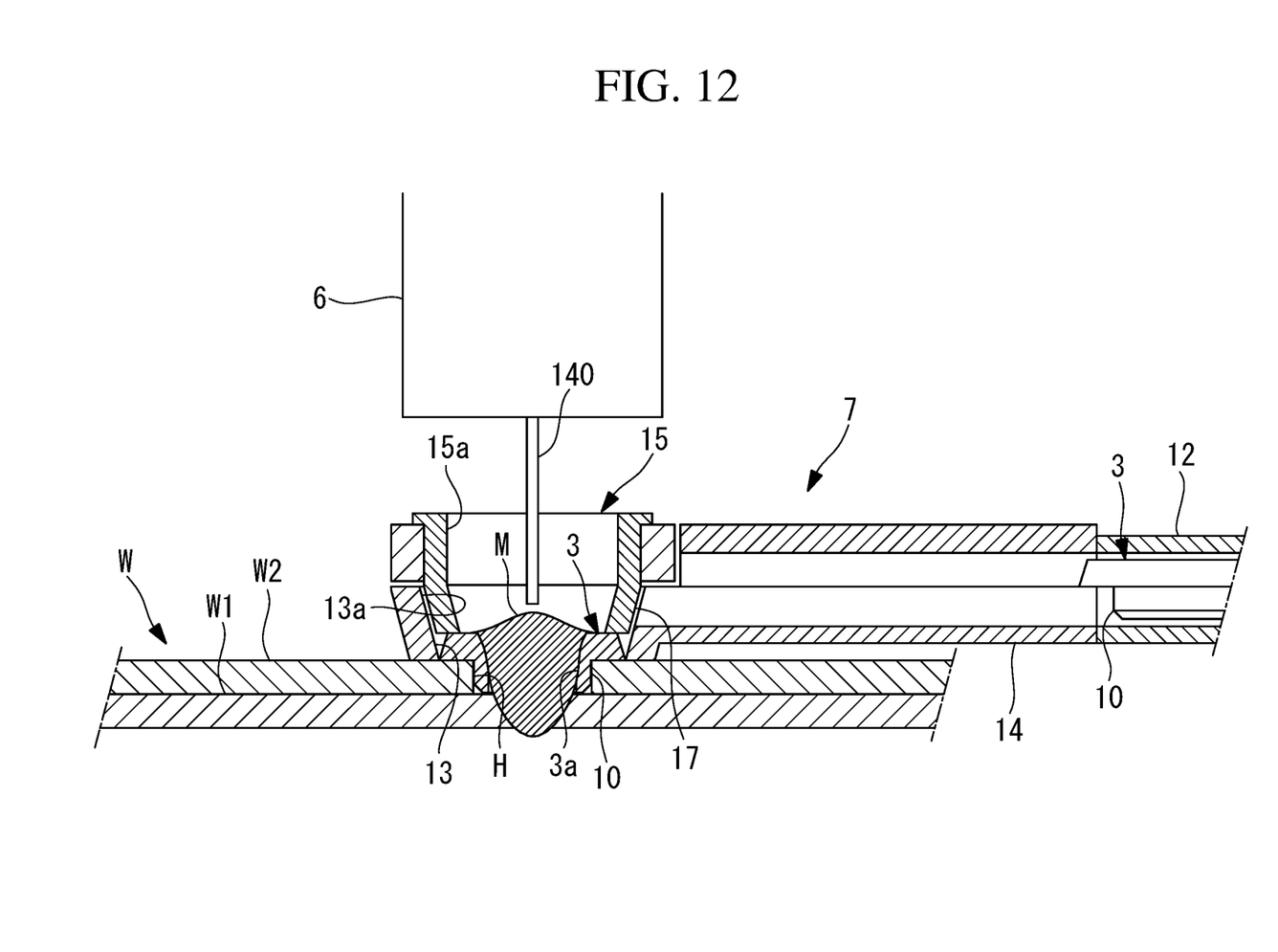
FIG. 12 is a partial longitudinal cross-sectional view showing a state in which a voltage is supplied to the welding wire in the state in FIG. 11 and arc welding is performed.
Figure 13:
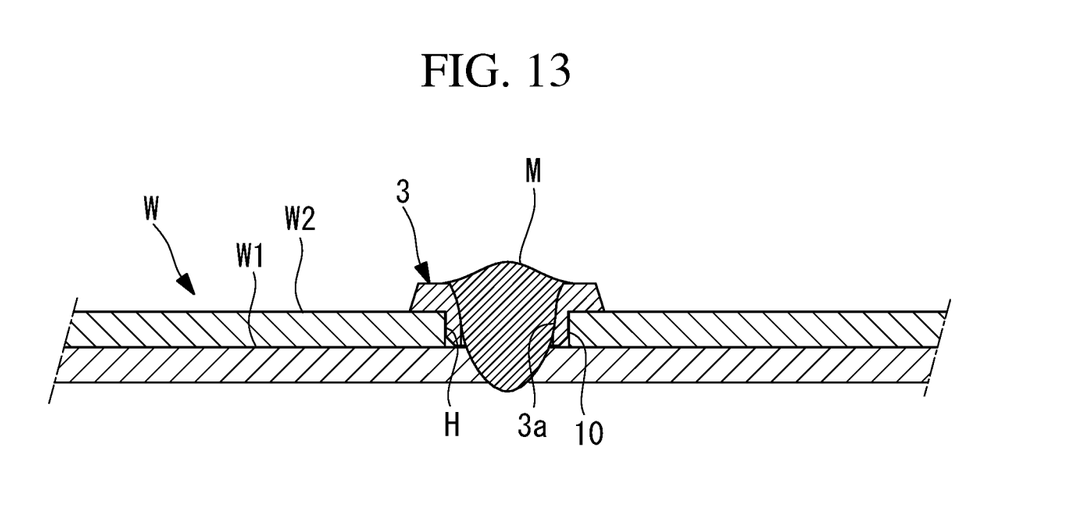
FIG. 13 is a longitudinal cross-sectional view showing the workpiece in which joining has been performed by means of the arc welding in FIG. 12.
Figure 14:
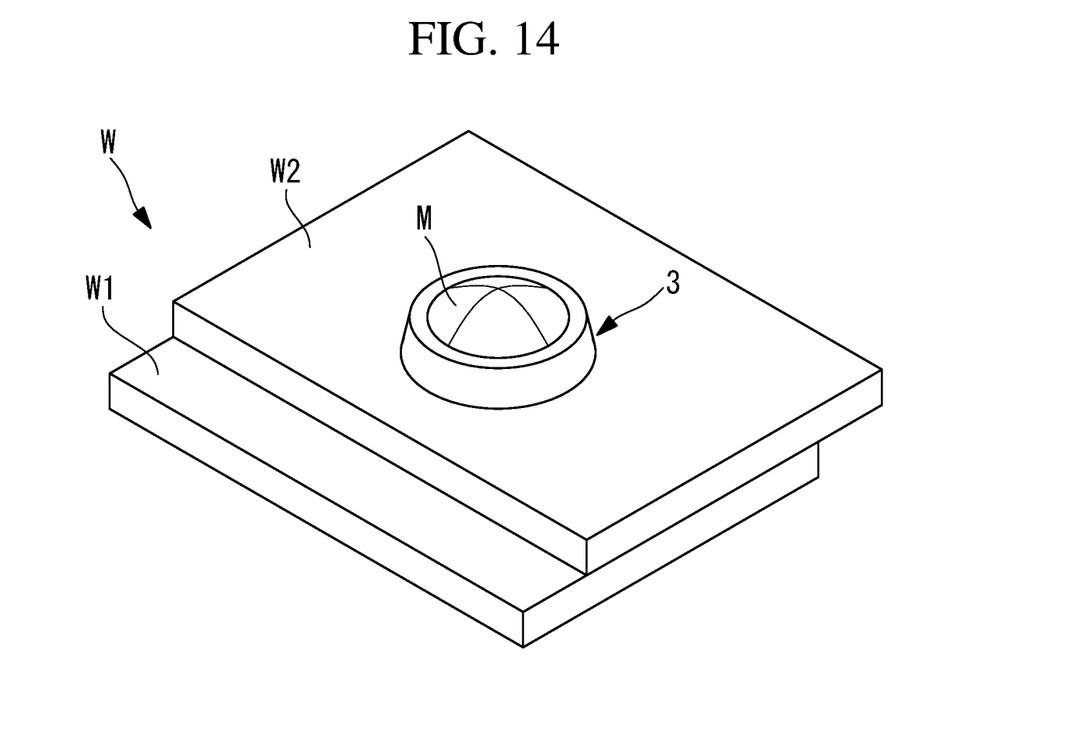
FIG. 14 is a perspective view showing the joined workpiece in FIG. 13.

In this state, the welding power supply 150 supplies a voltage to the distal end of the arc welding torch 6 to start arc welding. As shown in FIG. 12, the through-hole H of the second metal plate W2 is filled with molten metals M of the welding wire 140 and the joining auxiliary member 3 in the vicinity of the inner surface of the inner hole 3a, and by melting down to the first metal plate W1, the joining auxiliary member 3 made of iron and the first metal plate W1 made of iron are joined together. By doing so, as shown in FIGS. 13 and 14, it is possible to join the first metal plate W1 made of iron and the second metal plate W2 made of non-ferrous metal in a laminated state in such a manner that the second metal plate W2 is sandwiched between the joining auxiliary member 3 and the first metal plate W1.

As described above, with the dissimilar-metal joining tool 1 according to this embodiment, the joining auxiliary member 3 is positioned in the workpiece W by the positioning mechanism 7, and arc welding is performed in a state in which the joining auxiliary member 3 is pressed against the workpiece W by the pressing mechanism 8; thus, joining is performed in a state in which the joining auxiliary member 3, the first metal plate W1, and the second metal plate W2 are brought into close contact with each other without any gap in the plate thickness direction. When the joining auxiliary member 3 is pressed against the workpiece W, the joining auxiliary member 3 is radially positioned by the tapered inner surface 13a of the guide hole 13; thus, it is possible to configure the positioning mechanism 7 in a simple manner.

When the joining auxiliary member 3 is pressed against the workpiece W, because the pressing mechanism 8 presses the vicinity of the outer peripheral edge of the joining auxiliary member 3 where the molten metals M of the welding wire 140 and the joining auxiliary member 3 do not come into contact, the pressing mechanism 8 is prevented from fusing with the joining auxiliary member 3, and it is possible to repeatedly perform the joining work at a plurality of locations, using different joining auxiliary members 3. By doing so, it is possible to automate the work of joining the first metal plate W1 made of iron and the second metal plate W2 made of non-ferrous metal, using the joining auxiliary members 3.

Although a device that pressure-feeds the joining auxiliary member 3 by air pressure has been illustrated as an example of the auxiliary member supply portion 4 in this embodiment, the invention is not limited thereto. For example, it is permissible to employ a device that supplies the joining auxiliary members 3, one by one, to a position in front of the arc welding torch 6 by feeding a tape to which a large number of joining auxiliary members 3 are attached.

Although the guide hole 13 having the tapered inner surface 13a has been illustrated as an example of the positioning mechanism 7 in this embodiment, alternatively, a chuck that radially grips the outer circumferential surface of the joining auxiliary member 3 may be employed. With this configuration also, the joining auxiliary member 3 can be pressed in the plate thickness direction by the pusher 15, and it is possible to perform the arc welding work while pressing the joining auxiliary member 3 against the surface of the second metal plate W2.

Although an example in which the ring plate-shaped joining auxiliary member 3 having the protrusion 10 is used has been described in this embodiment, alternatively, a ring plate-shaped joining auxiliary member 3 not having the protrusion 10 may be used.

As a result, the following aspect is derived from the above described embodiment.

An aspect of the present invention is a dissimilar-metal joining tool that places a ring-shaped joining auxiliary member made of iron, on a surface of a workpiece in which a second metal plate made of non-ferrous metal is disposed on a first metal plate made of iron in a laminated state, coaxially with a through-hole provided so as to penetrate through the second metal plate in a plate thickness direction, and that performs arc welding toward an inner hole of the joining auxiliary member, the dissimilar-metal joining tool including: a base that is attached to a distal end of a robot; an arc welding torch that is attached to the base; a positioning mechanism that is provided in the base, and that places the inner hole at a joining position in front of the arc welding torch and holds the joining auxiliary member in a radially-positioned state; and a pressing mechanism that presses the joining auxiliary member, which is held by the positioning mechanism, in the vicinity of an outer peripheral edge and in a thickness direction.

With this aspect, the robot is actuated to move the base with respect to the workpiece in which the second metal plate made of non-ferrous metal is stacked on the first metal plate made of iron in a laminated state; the arc welding torch provided on the base is disposed at a position facing the through-hole of the second metal plate; and then, the positioning mechanism is actuated to place the inner hole of the ring-shaped joining auxiliary member at the joining position in front of the arc welding torch, and the joining auxiliary member is held in a radially-positioned state with respect to the through-hole. Subsequently, the pressing mechanism is actuated to press the joining auxiliary member in the thickness direction, whereby the joining auxiliary member is pressed against the surface of the second metal plate.

In this state, the arc welding torch is actuated, and by inserting a welding wire into the inner hole of the joining auxiliary member and causing arc to be generated therein, molten metals of the welding wire and the joining auxiliary member are loaded until the inner hole of the joining auxiliary member and the through-hole of the second metal plate are filled, thus joining the joining auxiliary member made of iron and the metal plate made of iron by means of welding. In other words, the second metal plate made of non-ferrous metal, which is laminated on the first metal plate made of iron, is joined to the surface of the first metal plate in a form in which the laminated state is maintained.

In this case, because the pressing mechanism presses the vicinity of the outer peripheral edge of the joining auxiliary member where the molten metals of the welding wire and the joining auxiliary member do not come into contact, the pressing mechanism is prevented from fusing with the joining auxiliary member, and it is possible to repeatedly perform the joining work at a plurality of locations, using different joining auxiliary members. By doing so, it is possible to automate the work of joining the first metal plate made of iron and the second metal plate made of non-ferrous metal, using the joining auxiliary members.

In the abovementioned aspect, an auxiliary member supply portion that supplies the joining auxiliary member to the joining position may be provided, wherein: the positioning mechanism may have a guide hole that accommodates the joining auxiliary member, which has been supplied by the auxiliary member supply portion, so as to be movable in a pressing direction; and the guide hole may have a tapered inner surface that is gradually tapered toward the front of the arc welding torch.

With this configuration, when the auxiliary member supply portion supplies the joining auxiliary member to the joining position, the joining auxiliary member is accommodated in the guide hole of the positioning mechanism. In this state, by actuating the pressing mechanism, the joining auxiliary member is pressed and moved toward the front of the arc welding torch.

Because the guide hole has the tapered inner surface, the joining auxiliary member is radially positioned while being moved. In other words, when the joining auxiliary member is accommodated into the guide hole from the auxiliary member supply portion, a large gap is secured between the inner surface of the guide hole and the joining auxiliary member to facilitate the accommodation into the guide hole, and when the joining auxiliary member is pressed against the surface of the workpiece, the gap between the inner surface of the guide hole and the joining auxiliary member is reduced; thus, the joining auxiliary member can be precisely positioned in a radial direction. By doing so, it is possible to easily automate the joining work at a plurality of locations, using different joining auxiliary members.

In the abovementioned aspect, the pressing mechanism may be provided with: a tubular pressing piece that has a central hole into which a welding wire supplied by the arc welding torch can be inserted, and an end face of which in an axial direction is disposed so as to face the vicinity of the outer peripheral edge of the joining auxiliary member supplied to the joining position; and an actuator that moves the pressing piece in the axial direction.

With this configuration, because the central hole of the pressing piece is disposed in the periphery of the inner hole of the joining auxiliary member even in a state in which the pressing piece is moved by actuation of the actuator and the joining auxiliary member is pressed by the end face of the pressing piece in the axial direction, it is possible to make the welding wire, which is supplied by the arc welding torch, reach the inner hole of the joining auxiliary member through the central hole.

In the abovementioned aspect, when arc welding is performed by the arc welding torch, the pressing piece may maintain the joining auxiliary member in a state in which the joining auxiliary member is pressed in the thickness direction.

With this configuration, it is possible to perform the arc welding work in a state in which the joining auxiliary member and the second metal plate are brought into close contact with a prescribed pressing force by means of the pressing mechanism, and it is possible to achieve a good joining state between the first metal plate made of iron and the second metal plate made of non-ferrous metal.

In the abovementioned aspect, a camera for detecting the through-hole formed in the second metal plate may be provided.

With this configuration, by detecting the through-hole with the camera before the positioning of the joining auxiliary member, it is possible to operate the robot on the basis of the position of the detected through-hole, and to position the joining auxiliary member with respect to the through-hole in a more precise manner.

REFERENCE SIGNS LIST

1 dissimilar-metal joining tool
3 joining auxiliary member
3a inner hole
4 auxiliary member supply portion
5 base
6 arc welding torch
7 positioning mechanism
8 pressing mechanism
9 camera
13 guide hole
13a tapered inner surface
15 pusher (pressing piece)
15a central hole
16 cylinder (actuator)
120 robot
140 welding wire
H through-hole
W workpiece
W1 first metal plate
W2 second metal plate

The invention claimed is:

1. A dissimilar-metal joining tool that places a ring-shaped joining auxiliary member made of iron, on a surface of a workpiece in which a second metal plate made of non-ferrous metal is disposed on a first metal plate made of iron in a laminated state, coaxially with a through-hole provided so as to penetrate through the second metal plate in a plate thickness direction, and that performs arc welding toward an inner hole of the joining auxiliary member, the dissimilar-metal joining tool comprising:

a base that is attached to a distal end of a robot;
an arc welding torch that is attached to the base;
a positioning mechanism that is provided in the base, and that places the inner hole at a joining position in front of the arc welding torch and holds the joining auxiliary member in a positioned state in radially direction of the joining auxiliary member; and
a pressing mechanism that presses the joining auxiliary member, which is held by the positioning mechanism, in the vicinity of an outer peripheral edge of the joining auxiliary member and in a thickness direction.

2. The dissimilar-metal joining tool according to claim 1, further comprising an auxiliary member supply portion that supplies the joining auxiliary member to the joining position, wherein:

the positioning mechanism has a guide hole that accommodates the joining auxiliary member, which has been supplied by the auxiliary member supply portion, so as to be movable in a pressing direction; and the guide hole has a tapered inner surface that is gradually tapered toward the front of the arc welding torch.

3. The dissimilar-metal joining tool according to claim 1, wherein the pressing mechanism is provided with: a tubular pressing piece that has a central hole into which a welding wire supplied by the arc welding torch can be inserted, and an end face of which, in an axial direction, is disposed so as to face the vicinity of the outer peripheral edge of the joining auxiliary member supplied to the joining position; and an actuator that moves the pressing piece in the axial direction.

4. The dissimilar-metal joining tool according to claim 3, wherein, when arc welding is performed by the arc welding torch, the pressing piece maintains the joining auxiliary member in a state in which the joining auxiliary member is pressed in the thickness direction.

5. The dissimilar-metal joining tool according to claim 1, further comprising a camera for detecting the through-hole formed in the second metal plate.

\* \* \* \* \*